(12) United States Patent
Roy et al.

(10) Patent No.: US 8,806,656 B2
(45) Date of Patent: Aug. 12, 2014

(54) METHOD AND SYSTEM FOR SECURE AND SELECTIVE ACCESS FOR EDITING AND AGGREGATION OF ELECTRONIC DOCUMENTS IN A DISTRIBUTED ENVIRONMENT

(75) Inventors: Shourya Roy, Chennai (IN); Meera Sampath, Rochester, NY (US); Keerthi Laal Kala, New Delhi (IN); Lakshmi Vaidyanathan, Chennai (IN); Timothy Gonsalves, Nilgiris (IN); Ashok Jhunjhunwala, Chennai (IN); Pratyush Prasanna, Chennai (IN); Jacki O'Neill, Grenoble (FR); James Michael Allen Begole, Los Altos, CA (US)

(73) Assignees: Xerox Corporation, Norwalk, CT (US); Rural Technology & Business Incubator, Chennai (IN)

( * ) Notice: Subject to any disclaimer, the term of this patent is extended or adjusted under 35 U.S.C. 154(b) by 19 days.

(21) Appl. No.: 13/364,745

(22) Filed: Feb. 2, 2012

(65) Prior Publication Data

US 2012/0216290 A1    Aug. 23, 2012

(30) Foreign Application Priority Data

Feb. 18, 2011   (IN) .............................. 481/CHE/2011

(51) Int. Cl.
*G06F 15/16* (2006.01)
*G06F 21/62* (2013.01)
*G06F 21/10* (2013.01)

(52) U.S. Cl.
CPC ............ *G06F 21/6227* (2013.01); *G06F 21/10* (2013.01)
USPC ................... 726/27; 726/26; 726/28; 726/29; 726/30; 726/31; 726/32; 726/33

(58) Field of Classification Search
CPC .............................. G06F 21/6227; G06F 21/10
USPC ....................................................... 726/26–33
See application file for complete search history.

(56) References Cited

U.S. PATENT DOCUMENTS

| | | | |
|---|---|---|---|
| 7,895,197 B2 * | 2/2011 | Meyer et al. | 707/728 |
| 8,099,423 B2 * | 1/2012 | Meyer et al. | 707/758 |
| 8,135,776 B2 * | 3/2012 | Bremer, Jr. | 709/203 |
| 8,250,464 B2 * | 8/2012 | Dang et al. | 715/234 |
| 8,495,656 B2 * | 7/2013 | Johnson et al. | 719/314 |
| 2006/0168511 A1 * | 7/2006 | Bauer et al. | 715/513 |
| 2007/0288644 A1 * | 12/2007 | Rojas et al. | 709/230 |
| 2008/0270361 A1 * | 10/2008 | Meyer et al. | 707/3 |
| 2008/0310619 A1 * | 12/2008 | Scheidt et al. | 380/28 |
| 2009/0006944 A1 * | 1/2009 | Dang et al. | 715/234 |
| 2009/0089658 A1 * | 4/2009 | Chiu et al. | 715/234 |
| 2010/0005147 A1 * | 1/2010 | Johnson et al. | 709/206 |
| 2010/0131614 A1 * | 5/2010 | Bremer, Jr. | 709/218 |
| 2011/0093462 A1 * | 4/2011 | Meyer et al. | 707/736 |

* cited by examiner

*Primary Examiner* — Haresh N Patel
(74) *Attorney, Agent, or Firm* — Rahman LLC

(57) ABSTRACT

Partial access to electronic documents and aggregation for secure document distribution is disclosed. The embodiments herein relate to providing access to electronic documents and, more particularly, to providing access to portions of electronic documents and aggregating such portions in secure document distribution environment. Existing document distribution mechanisms do not provide means to access partial documents based on the attributes such as roles of the agents within an organization, location of access, time of access, device ID and so on. The disclosed method allows agents to access partial contents of documents based on the attributes. Meta data tags are attached to the documents in order to control the access of the documents by the defined attributes. The agent who wishes to access the document enters his credential and based on the credentials he is provided access to the content that is assigned for him

7 Claims, 13 Drawing Sheets

| | Manufacturing Operations Production Report | | | | | | |
|---|---|---|---|---|---|---|---|
| | Location | | Number of centers | | | Note | |
| | Manager name | | Number of emp | | | | |
| | Manager No | | | | | | |
| | Client | | | | | | |

| Centre No | Date | # items ordered | # items completed | # defects if any | Items shipped today | Estimated date of completion | Comments |
|---|---|---|---|---|---|---|---|
| Site 1 | 11th may 2010 | 56 | 33 | 10 | | | Delay due to rains |
| Site 2 | 11th may 2010 | 100 | 100 | 0 | | | Shipping rest by weekend |
| Site 3 | 11th may 2010 | 49 | 50 | 0 | | | Cleared backlog of 10th may |
| Site 1 | 12th may 2010 | 50 | 0 | 0 | | | closed |
| Site 2 | 12th may 2010 | 50 | 50 | 0 | | | |

Manufacturing Packaging

| Date | # Ord | # Cmp | # def | # Shp | Com |
|---|---|---|---|---|---|
| 11/5 | 65 | 33 | 10 | 33 | Dela. |
| 12/5 | 50 | 0 | 0 | 0 | Cls. |

Total for this month

FIG. 10

| Manufacturing Bo Prasama | | | | | |
|---|---|---|---|---|---|
| Date | #Ord | #Cmp | #def | #Shp | Com |
| 11/5 | 65 | 33 | 10 | 33 | Dela.. |
| 12/5 | 50 | 0 | 0 | 0 | Clos.. |
| Total for this month | | | | | |
| 115 | 65 | 10 | 33 | | | update

SELECT  BACK

| Manufacturing Bo Prasama | | | | | |
|---|---|---|---|---|---|
| Date | #Ord | #Cmp | #def | #Shp | Com |
| 11/5 | 65 | 33 | 10 | 33 | Dela.. |
| 12/5 | 50 | 0 | 0 | 0 | Clos.. |
| Total for this month | | | | | |
| 115 | 65 | 10 | 33 | | |

Insert

SELECT  BACK

FIG. 10 (cont.)

METHOD AND SYSTEM FOR SECURE AND SELECTIVE ACCESS FOR EDITING AND AGGREGATION OF ELECTRONIC DOCUMENTS IN A DISTRIBUTED ENVIRONMENT

CROSS-REFERENCE TO RELATED APPLICATIONS

This application claims priority to Indian Application No. 481/CHE/2011 filed on Feb. 18, 2011, the contents of which, in its entirety, is herein incorporated by reference.

TECHNICAL FIELD

The embodiments herein relate to providing access to electronic documents and, more particularly, to providing access to portions of electronic documents and aggregating such portions in a secure document distribution environment.

BACKGROUND

Phenomena such as globalization of economies and emergence of communication technologies over the past two decades have resulted in the need for enterprises and individuals to work in distributed environments. The need to work in distributed environments has resulted in the need for people to collaborate and work on documents simultaneously.

Over the past few years, various solutions have been proposed that allow people to distribute a single document and work together on the document. However, present solutions have various limitations. These limitations include security of data being transmitted between multiple locations, integrity of data being worked upon, and bandwidth issues.

In many instances, while there is a single document being built, it is possible that some portions of the document may be more confidential than others. Solutions for collaboration presently available do not allow for distribution of selective portions of documents based on confidentiality of the portions or any such criteria.

Further, since present day solutions allow for users collaborate on complete documents, there has been no need to check consistency of documents based on edits from different users. Present day solutions use version control to maintain different versions of a full document and allow users to resolve conflicts in edits. However, in cases where users cannot access whole documents for editing, there is no way users themselves can check and resolve conflicts.

Furthermore, present day solutions on collaboration do not consider the fact that different people may have different bandwidth constraints. Consider the example of a backend Business Process Operation that involves multiple teams located in remote areas (such as rural areas) in developing economies. Usually, rural areas in developing economies do not have same level of access to various computing devices, the Internet and other communication technologies. Similarly, users on mobile devices using older generation cellular technologies may have limited bandwidth access. Present day solutions do not allow for people with such limitations in terms of access to devices and connectivity to access specific portions of documents to work on.

Therefore, there is a need for a solution that enables distribution of documents that addresses the concerns of security of information, integrity of information, and limited connectivity of users.

SUMMARY

In view of the foregoing, an embodiment herein provides a method of providing access to portion of a document in a distributed environment. The method comprising identifying structural components in the document for criteria based access by a document parser, embedding the criteria based access information in the document by a document splitter and providing access to identified structural components of the document to identified agents based on the criteria.

One disclosed feature of the embodiments is a server for providing access to a portion of a document in a distributed environment. The server comprising a document parser for identification of the document type by parsing the document and a document splitter for attaching criteria based access control information in the document type.

Another disclosed feature of the embodiments is a client terminal for providing access to structured components of a document in a distributed environment. The client terminal comprising decrypting one or more structured components of the document received, identifying one or more structured components of the document to be accessed based on criteria and providing access to an agent operating the client terminal to the one or more structured components of the document.

Another disclosed feature of the embodiments is an aggregation module for providing access to portions of a document in a distributed environment. The module comprising at least one means for performing consistency check for the document by determining overlapping regions of the document, comparing overlapping regions of the document, highlighting the overlapping regions if there is mismatch in the content of the overlapping regions and concatenating updated portions of the document.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which:

FIG. 10 is a snapshot depicting an example implementation of accessing partial electronic documents, according to an embodiment herein.

DETAILED DESCRIPTION OF EMBODIMENTS

Figure 1:
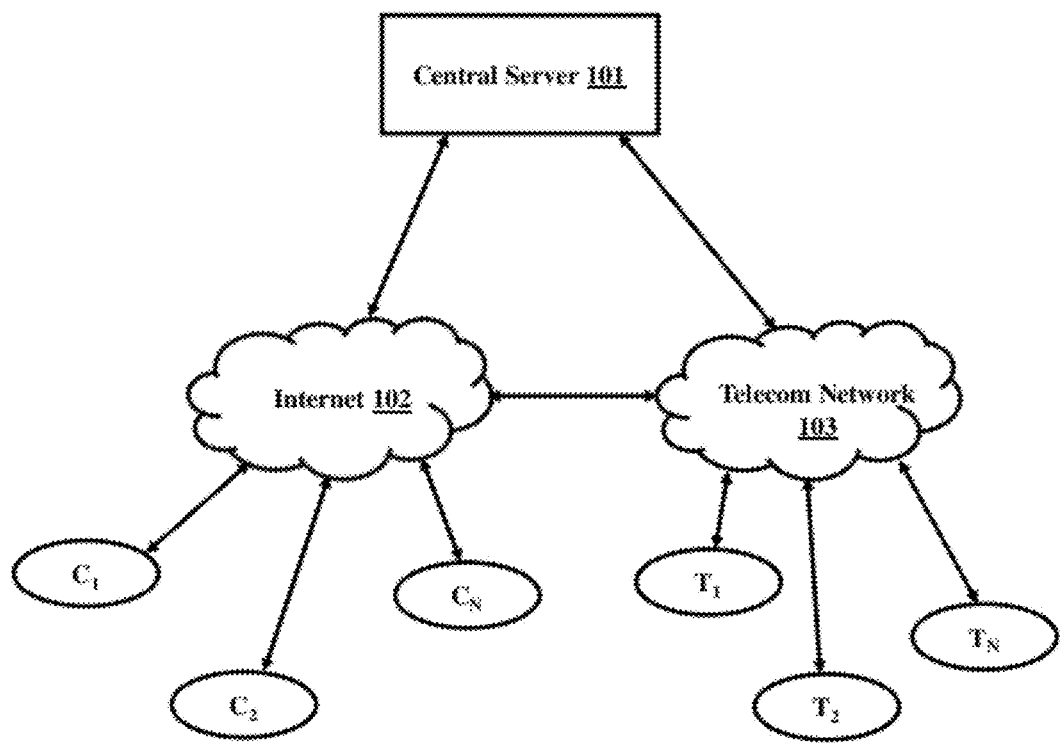
FIG. 1 illustrates the architecture of the system, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method for providing role based access to partial electronic documents in a secure document distribution environment. Referring now to the drawings, and more particularly to FIGS. 1 through 11, where similar reference characters denote corresponding features consistently throughout the figures, there are shown embodiments.

Definitions

Structured document: As used herein structured document is defined as a set of digital data that is obtained by the system by appropriate means and possesses a definite form, template or structure for the organization of content. Examples include a form, a spreadsheet and so on.

Unstructured document: As used herein unstructured document is defined as a set of digital data that is obtained by the system by appropriate means and does not possess a definite form, template or structure for the organization of content. Examples include a word document, a PDF document and so on.

Document fragment: As used herein document fragment is a portion or a section of a structured or an unstructured document.

Super Document: As used herein super document is set of digital data and comprises information embedded within it. This embedded information defines the access to the document. The access may be based on several attributes such as role, location, time and terminal ID among others.

Document parser: As used herein document parser is an entity that comprises hardware means, software means or a combination of hardware and software means, controlled by the system and having the function of parsing documents, both structured and unstructured.

Document Splitter: As used herein document splitter is an entity that comprises hardware means, software means or a combination of hardware and software means, controlled by the system and having the function of dividing or splitting structured or unstructured documents. In addition, the document splitter also embeds XML data within the document. The XML data indicates the access control information.

Aggregation module: As used herein the aggregation module or also referred to as document merger is an entity that comprises hardware means, software means or a combination of hardware and software means, controlled by the system and having the function of receiving modified documents or portions of the documents, performing consistency check on the documents, determining overlapping sections in the documents and merging sections of the documents to form a new document.

Structural components: As used herein structural document is set of digital data and comprises information embedded within it. Structural components include parts of the document such as section, paragraph, page, chapters and so on.

A system and method for providing partial access to electronic documents and aggregation of such documents is disclosed. The method also allows secure document access and distribution. Further, the access to such documents may be provided based on several factors that include role based access, location based access; device ID based access, time based access and so on. The method enables large organizations in order to handle documents and provide secured access to the documents. In an embodiment, the document may be a structured document or an unstructured document.

For role based partial document access, parts of the document are provided to different agents based on their roles in the organization. For example, in an organization with different levels of hierarchy every agent is defined his roles within the hierarchy system. The method provides role based limited access to unstructured documents for every agent. An agent who wants to access the document enters his user credentials and information. This information is sent to a central server that processes his information. The agent is then provided access to the content of the document at the client side based on his role within the organization. Further, the agent is provided access to only the content that is accessible for his roles in the organization based on the user credentials entered by him In another embodiment, the agent may be provided location based access or time based access to the documents. In such a case, when the agent logs in from his location his location information is tracked by the system. The location of the agent is identified, and then based on the location ID tags; the agent is provided access to the specified sections of the document. On similar lines, the agent may also be provided access to portions of the document based on the device ID employed for accessing the document.

The agent further works on his part of the document and makes updates on the document when required. Finally, the modifications made by every agent on his section of the document content are aggregated at the central server and the document is again recreated. Further, since splitting and aggregation will be automated, the probability of errors associated with manual handling of large data will be reduced considerably, increasing quality control. More importantly, splitting a document ensures security of the document contents as only portions of the documents are accessible to individual agents. As a result, splitting assures that the security of the document is maintained. In an embodiment, the method performs conflict detection, consistency checking and merging in order to ensure that the structure of the document is preserved.

FIG. 1 illustrates the architecture of the system, according to an embodiment herein. As depicted in the architecture the document access system employs a central server 101, the Internet 102, the telecom network 103, plurality of agents connected to the Internet i.e., C1, C2 . . . Cn. In addition, plurality of agents are also connected to the telecom network 103 i.e., T1, T2 . . . Tn.

The central server 101 is configured to handle the requirements of every agent and process the request from the agent. In an embodiment, the central server 101 may receive a request for partial content of a document or the complete document based on the agent's requirements. Further, the document may be a structured document or an unstructured document. In another embodiment, the central server 101 may also be configured in order to provide access to the documents based on roles of the agent within the organization, location of the agent, time of access, device ID of the agent and so on.

In all the aforementioned scenarios the central server 101 determines the type of content or the document that is allowed for access to the agent. The central server 101 then embeds the necessary access control information within the document and sends the document to the agent for access. In another embodiment, the access control information may be embedded within a super document and sent to the agent side or it may be located on the central server 101. In the later case the central server 101 authenticates the agent and provides access to the required content. In an embodiment, the agent may be a mobile agent or may be located at a single place. If the agent is a mobile agent he may access the document through the telecom network 103 and if the agent is not a mobile agent he may access the document through the Internet 102.

Agents who are non mobile may access the document or portions of the document through Internet 102. The agents C1, C2 . . . Cn may access the document or portions of the document on their devices. The device may be a desktop, laptop, mobile phone and so on.

Agents who are mobile and require to be moving from one location to another may access the document or portions of the document through the telecom network 103. The agents T1, T2 . . . Tn may access the document or portions of the document through the telecom network 103. An advantage associated with the telecom network 103 is that it provides access to information even in remote locations where the Internet connectivity is limited.

Figure 2:
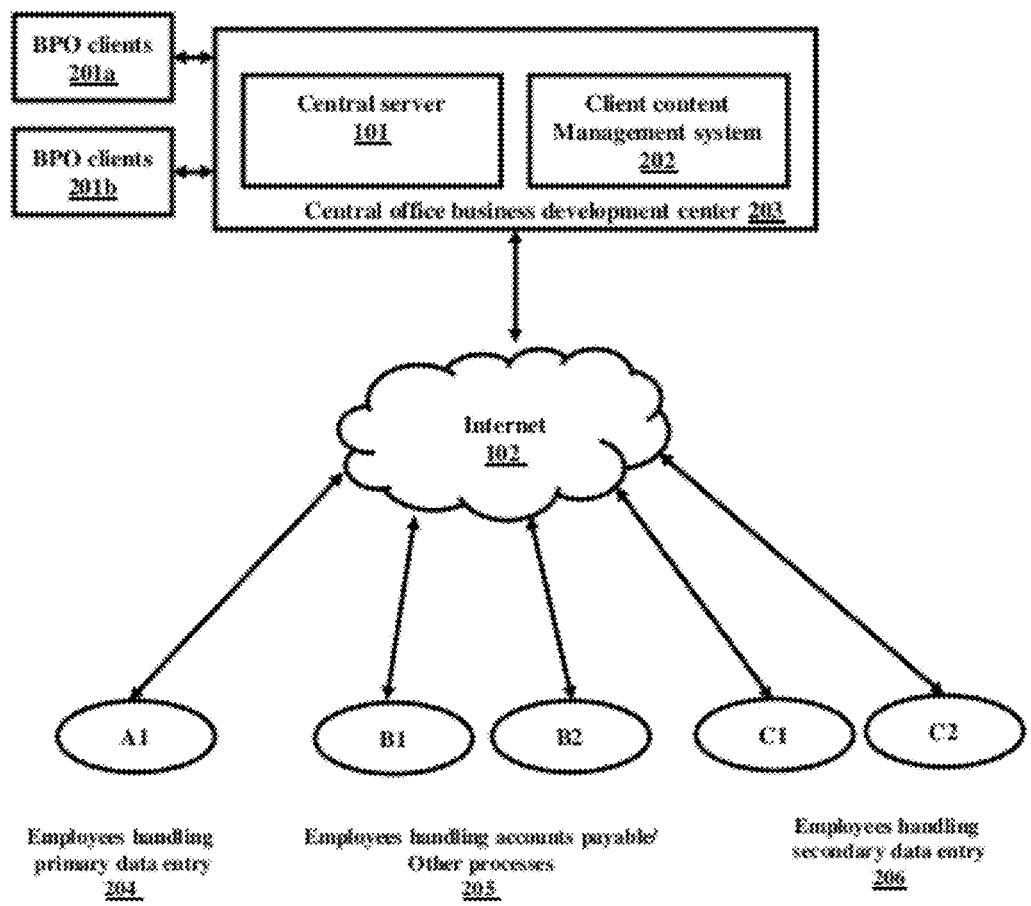
FIG. 2 illustrates an application in a BPO scenario for partial document access, according to an embodiment herein.

FIG. 2 illustrates an application in a BPO scenario for partial document access, according to an embodiment herein. As depicted is an organizational hierarchy system that operates on a distributed working model and comprises of different levels in a document distribution scenario. In the distributed module, the headquarters has a development team who get in new contracts; the work is then split up and allocated across various rural centers according to staff skills, availability and so on. In the present scenario, the company may employ and train people located at different regions to meet the back office demands of the clients.

In the considered scenario, the environment is a rural environment where connectivity issues do not allow access to the whole document. As a result, portions of the document may be split and sent to the agent based on their requirements.

In an embodiment, the work obtained by the central server 101 from the BPO sites 201a, 201b is allocated among different levels of the organizational hierarchy by the client content management system 202. The allocation is performed through the network elements involving the Internet 102. In another embodiment, the work may be allocated even through the telecom network 102. Further, the work is distributed among different employees who are at the root of the hierarchical tree. In another embodiment, there is bidirectional work flow within the organizational hierarchy.

At the root of the hierarchy are employees who are involved in collection of data and data entry operations. In another embodiment, the employees may perform operations such as translations, proof reading and so on. In the example depicted, the employees include employees Al handling primary data entry 101, employees B1, B2 who are responsible for handling accounts payable and other processes, employees C1 and C2 who are handling secondary data entry operations. The tasks performed include digitization of the document, transcription, translation and the like.

In an example, when employees perform digitization of the data, agents key in data from scanned images of structured documents like insurance forms, electronic health records into customer and patient databases, MS Excel documents etc.

The data entered by these employees is sent to the next levels in the hierarchy. In the next level, the digitized data is accessed by the regional coordinators. The regional coordinators verify the digitized data for any errors, modifications and validity of the documents.

The verified data is then sent to the next level i.e., to the product managers. The project managers coordinate schedules performance and productivity of the work performed.

The data is then sent to the client relationship head that approves the data. On approval, the data is sent to central office business development center 203 through the Internet 102. The central office business development center 203 interfaces to a plurality of Business Processing Organization (BPO) clients. The documents sent from the BPO clients are stored on the central server 101 within the central office business development center 203. Further, the distribution of theses documents is handled by the client content management system on the central office business development center 203. The client content management system 202 ensures that the access to the document is provided based on the role of the agent within the organization. At the central office business development center 203 the data is stored on a central server 101 and a client content management system 202. The central server 101 stores any data and documents uploaded by the managers. Further, the central server 101 also allows updating the data stored and aggregation of the documents. The client content management system 202 manages the data and documents input by the client and provides access to the same as and when required.

The embodiments described above illustrate an example implementation and does not aim to limit the scope of the application. The access to the documents in illustrated as being role based however this may be extended to deice ID based access, location based access, time based access and so on.

Figure 3:
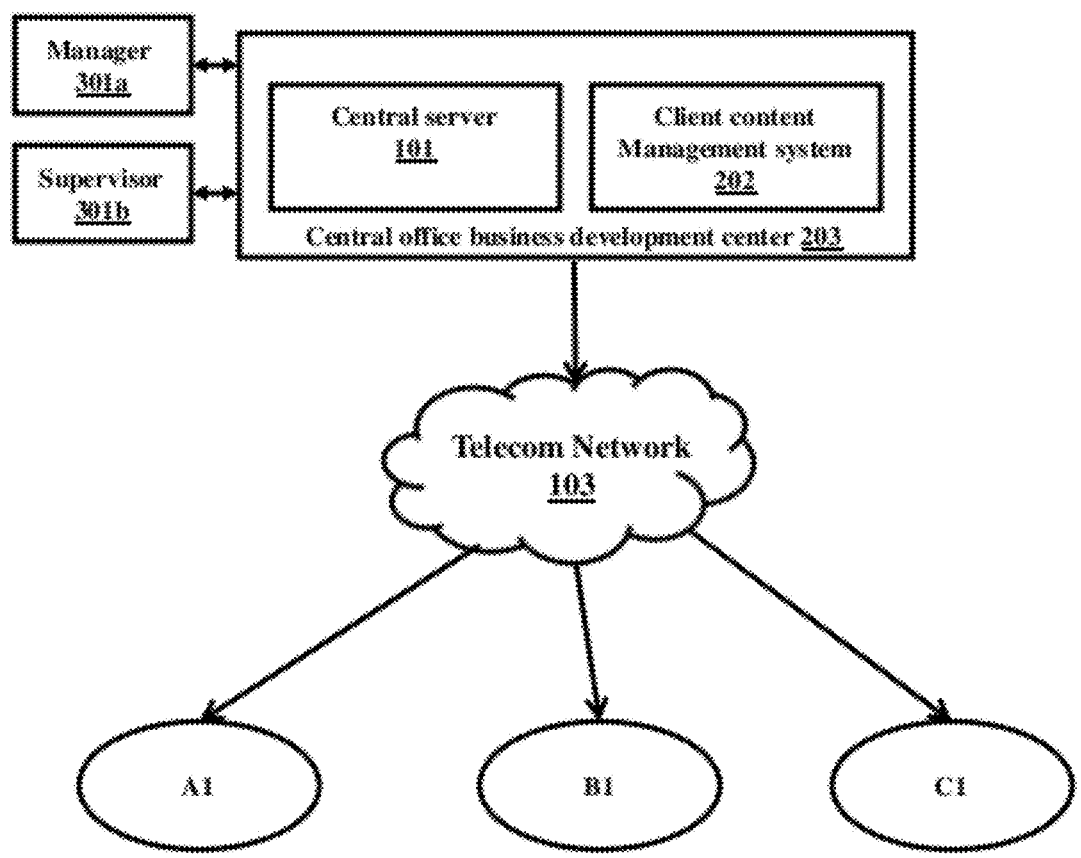
FIG. 3 illustrates an application for mobile agents for partial document access, according to an embodiment herein.

FIG. 3 illustrates an application for mobile users for partial document access, according to an embodiment herein. The scenario illustrates a shop floor in a manufacturing environment. The environment comprises managers 301a, supervisors 301b who are involved in performing management functions. The central server 101 and a client content management system 202 that reside within the central office business development center 203. The central office business development center 203 interfaces with the telecom network 103. The telecom network connects the agents A1, B1 and C1 to the central office business development center 203.

In such an environment, the managers 301a, or the supervisors 301b who are involved in the management process need to travel from one location to another in order to update the work status. Further, the managers 301a or supervisors 302b may also keep moving to different locations due to distributed nature of the work at the work place.

In an embodiment, as the managers 301a or supervisors 301b in this case are mobile there may be problems associated with accessing the content through the Internet 102. In such a case, the documents or portions of the document may be accessed through telecom network 103. The managers 301a or supervisors 301b define the work flow and store it at the central server 101.

The central server 101 parses the documents, splits the documents and embeds the access control information within the document based on certain factors. In another embodiment, the access control information may be embedded in a super document format and sent or it may be stored on the central server 101. The factors taken into consideration may be location of the agents A1, B1 and C1. As every agent A1, B1 and C1 may access the document from a different location the central server 101 tags the documents with location information. The location tagging feature helps the agent side device in order to authenticate the agent and provide him access to only that content that is tagged for his location.

In an embodiment, the device may include mobile phone, smart phone, laptop, desktop and so on. The ID may be a unique ID assigned for the device, a Mac ID, mobile phone number, mobile phone number in combination with a pass code and so on. Further, the mac id, user id and the like may be referred to together as terminal identifiers.

In another embodiment, the manufacturing environment may also comprise sales agents who access the documents required by them from the central server 101. Further, they may perform required edits, modifications on the accessed documents and later feed their actual sales figures at the end of the day back to the document on the central server 101.

In another embodiment, the access control information may be embedded based on the device ID of the agent. In such a case, every agent's device is provided with an ID for identification. When the agent logs in from his device, the central server 101 may authenticate the device ID along with the agent's name, his mobile phone number and so on. Based on the agent's credential the agent may be provided access to the content designated for him In an embodiment, there is bidirectional flow of information between the agents and the central server 101. Further, the modified document from the agents A1, B1 and C1 are sent to the central server 101 through the telecom network 103. Further, the client content management system 202 handles client data. At the central server 101 the received documents or portions of the documents from different agents are merged and aggregated. The document may be further converted into its original format and stored on the central server 101. The embodiments described above illustrate an example implementation and do not aim to limit the scope of the application.

Figure 4:
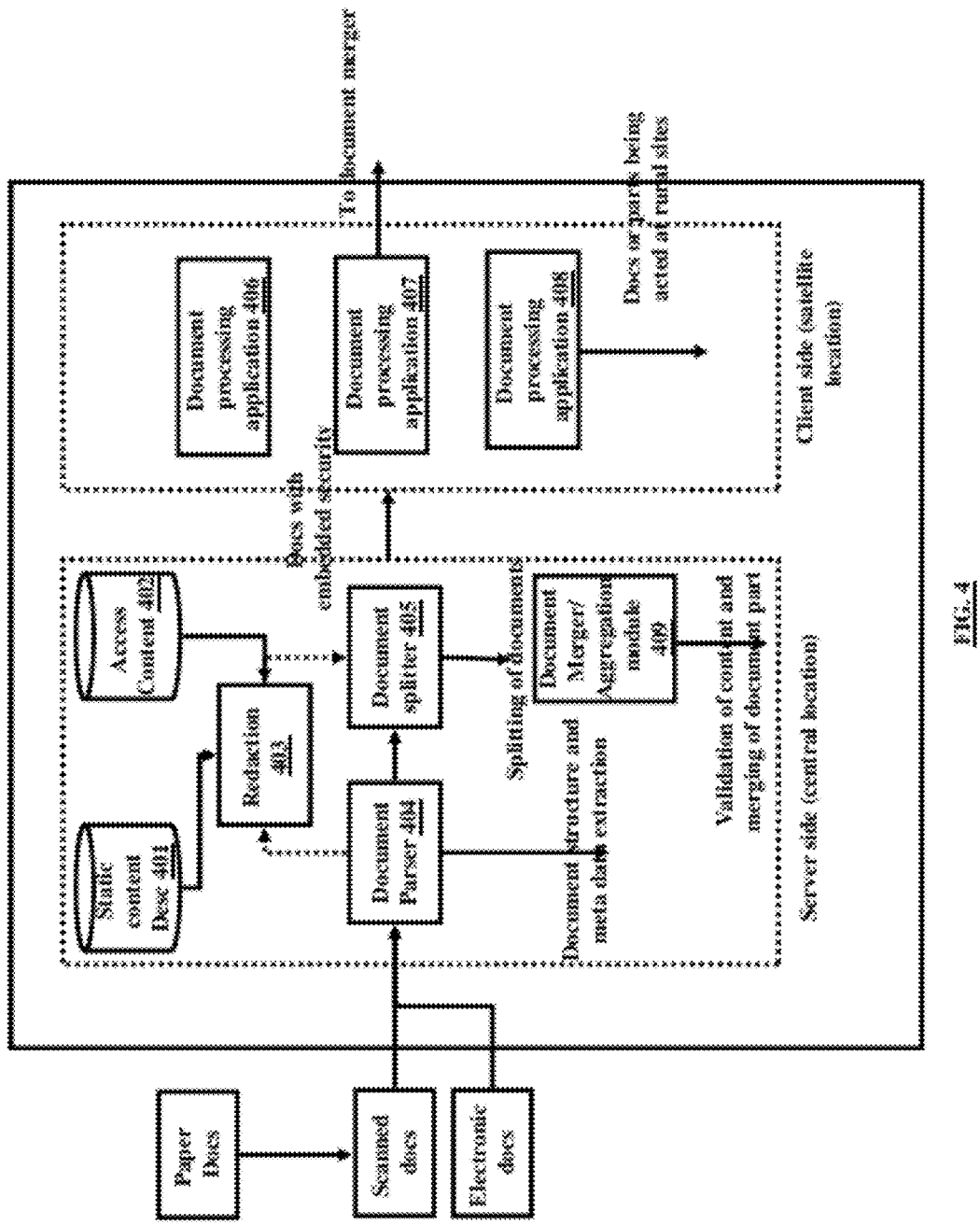
FIG. 4 illustrates the modules within the system architecture, according to an embodiment herein.

FIG. 4 illustrates the modules within the system architecture, according to an embodiment herein. The architecture follows a client server based paradigm where the server side component sits at the central server and the client side component sits in the computers of the agents. At the high level, the server side component is responsible for understanding the document structure and attaching security information to the document structure. On the other hand, the client side component is responsible for creating or rendering authorized content to agents based on their credentials. It also aggregates modified parts of the documents.

The paper documents or data that is available in a non electronic format is converted into electronic format. This is done by digitization of the documents. During digitization, the agent's key in data from different types of documents such as scanned documents, paper formats and so on and converts the same into electronic format. In another embodiment, the data may also be available directly in electronic format. The data in the electronic format is fed into the server side component. At the server side component the document is received by the document parser 404.

Static content description 401 is a database that interfaces with the redaction module 403. The static content description 401 defines which sections of the documents are accessible for different roles in the organization.

The access content 402 is a database that interfaces with the redaction module 403. The access content 402 defines the roles for different agents and the agents who can access the document, the access rights associated with the documents and so on.

Redaction module 403 provides an option in order to hide any content desired by the agents. In an example, there may be a scenario where parts of the document contain confidential information and the access to this particular information is limited to only the managers. In such case, the redaction module 403 may be employed to hide the section of the document and provide access to the managers only. In another example, an agent may want to hide portions of the document that contain sensitive information such as account number, social security key and so on. In all such cases the redaction module 403 helps in order to hide the information.

At the document parser 404 the document is parsed to determine the type of the document, start of the document, end of the document, contents or portions within the documents that are to be accessed by different agents and so on. Different types of documents like MS word, MS excel, PDF and so on are identified by the document parser 404. Further, a page count or content analysis is performed. The analyzer analyzes contents of the documents and extracts Meta information like author, count of sections, paragraphs, images and pages. All the meta information is fed to the next module 'document splitter'. In addition, the document parser may also help to identify the sections of the documents for access based on roles, location and time of access.

The document is sent to a document splitter 405. The document splitter 205 splits the document according to the credentials of every agent; it defines what part of the documents is allowed to be accessed by which agent. In another embodiment, the document splitter 405 may also define location tags to the documents meaning that every document may be tagged as to which location it may be accessed by the agent. As a result, splitting of documents happens at the document splitter 205. Document splitter helps to pull out required sections of the documents.

The document is then sent to the client side component. The client side component is any satellite location where the agent would like to access the parts of the document when required. When there is a request from the client side location for the document or part of the document the request is sent to the central server 101. The central server 101 determines the location from where the document is fetched and the type of document requested. The central server 101 then sends the document to the document processing application 406, 407 and 408 at the client site. In an embodiment, the client location may be determined by employing GPS, GPRS or other cellular network facilities.

Further, the document processing applications 406, 407 and 408 allow the agents to make modifications, updates and edits on the documents. Further, the document accessed at different client sites are considered and aggregated. Aggregation is performed by the document merger 409.

The document merger 409 located at the server side merges different sections of the documents and updates the versions of the document for ease of access to the document at a later point in time. In addition, the document merger 409 also ensures that the sanctity of the document is preserved. While aggregation, each new part-of-document is compared against the overlapping portions of the adjacent parts for example, by calculating MD5 hash value of content. If there is a mismatch in computed hash values, then they are flagged as conflict and sent for manual validation. In some application, automatic validation could also be possible.

Figure 5:
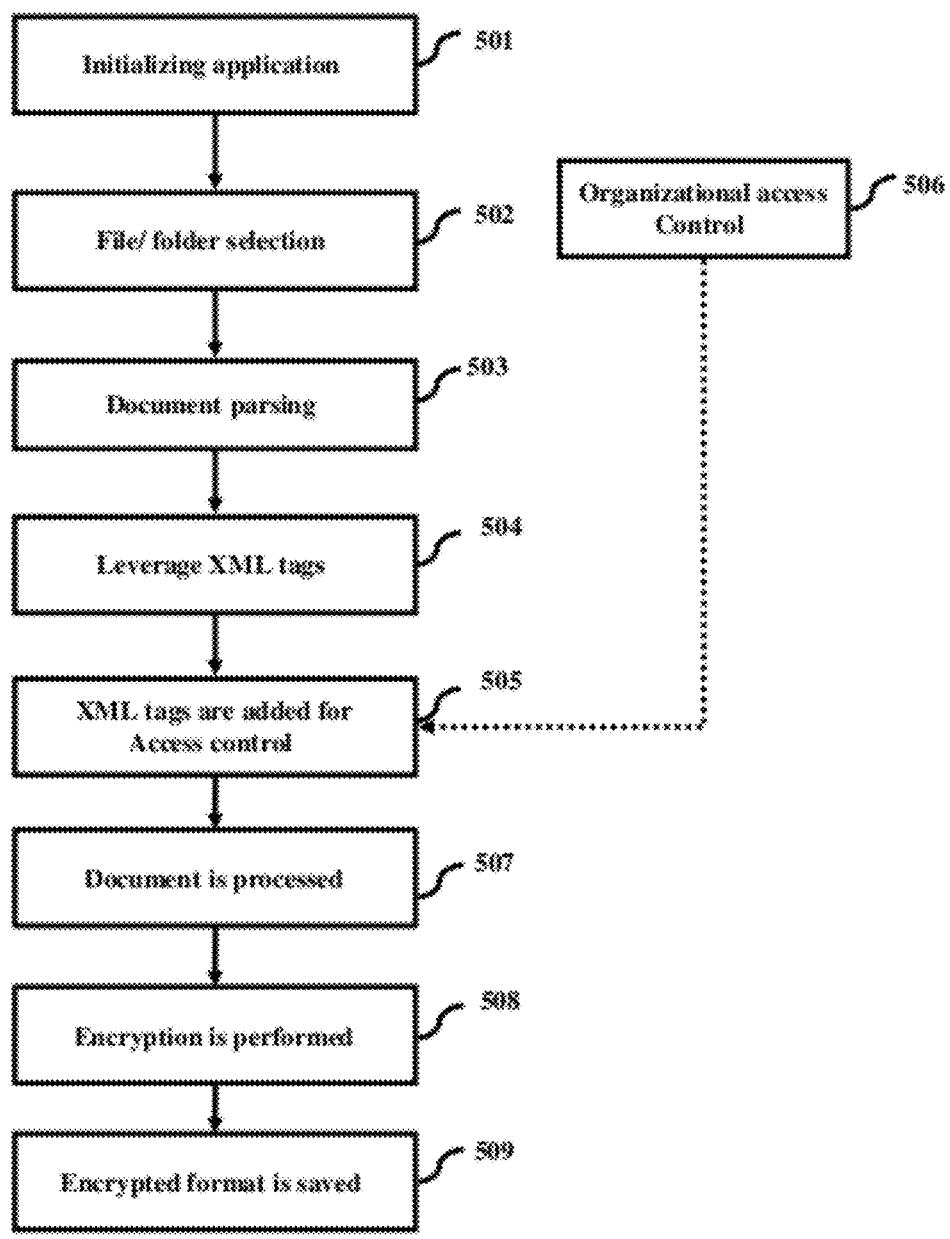
FIG. 5 is a flow diagram depicting the server side document processing, according to an embodiment herein.

FIG. 5 is a flow diagram depicting the server side document processing, according to an embodiment herein. The embodiments herein consider that the entire document is sent to the agent. However, the same may be limited to a portion of the document as well. At the beginning the applications are initialized (501). During initialization, the applications for which the access control is to be provided are identified. On initialization, the file or folder containing the document for which access control is to be enabled is selected (502). In an embodiment, the document may be a structured document or an unstructured document. The identified document is then parsed (503) by the document parser 404. During document parsing, two basic steps are carried out one is the document type identification and page count and content analysis. In case of document type identification process, the type of document is identified. The document type may be MS word, MS excel, PDF and so on. During document parsing, start of the document, end of the document, contents or portions within the documents that are to be accessed by different agents and so on are identified. In an embodiment, document parser 404 may also help to identify the sections of the documents for access based on roles, location and time of access. In the second step, page count and content analysis is performed. During this step, the content is analyzed and Meta data information is extracted such as author, count of sections, images and pages. The extracted Meta data information is fed to the next module i.e., the document splitter 405 where the document is further processed. The document splitter implements the business logic behind splitting and performs file selections and XML conversion. During XML conversion the relevant XML representations for the document are created (504). During this process, the document parser actually leverages XML tags to identify the structural elements like sections, paragraphs and the like. Further, the document is attached (505) appropriate XML tags for access control. During this step, the access control information is accessed from organization access control logic. This converts the logic into XML and embeds all the XML based representations. A single data packet is created for transmission. The XML tag for access control is as depicted below:

```
<AccessControl>
  <user>ramdin</user>
  <section_with_access>1,5-7</section_with_access>
  <overlapping_section>7</overlapping_section>
</AccessControl>
```

In an embodiment, the access control information embedded within the document may be based on several attributes that include the location of the agent, device ID of the agent, time of access and so on. When the agent is mobile the access control information may be tagged within the document and may be tagged based on the location. For example, if a supervisor A is known to be accessing information from his site X and another supervisor is known to access information from his site Y. During embedding access control information, the document to be accessed by supervisor A is tagged with location X and the document to be accessed by supervisor B are tagged with location Y. When supervisor A reaches his site X he is provided access to only his document that is tagged for location X. On similar lines, supervisor B is provided access to his document. Examples of XML tags for location and device ID are illustrated below:

```
<AccessControl>
  <location>UTM 10S 0545980E 4185742N</location>
  <location_range>1000</location_range>
```

-continued

```
  <section_with_access>1,5-7</section_with_access>
  <overlapping_section>7</overlapping_section>
</AccessControl>
```

As illustrated above, in some embodiments, location access information may be specified using a UTM based location coordinate and the radius within which access to the document will be provided.

```
<AccessControl>
  <device_ID>00-0E-18-DD-33-F7<device_ID>
  <section_with_access>1,5-7</section_with_access>
  <overlapping_section>7</overlapping_section>
</AccessControl>
```

As illustrated above, in some other embodiments, access may be provided based on device identifiers. For example, a mac id could be a device identifier. And only a person that has access to a particular device may obtain to access to information with such access control.

Further, the organizational access control is also performed (506) in order to attach XML tags for access control. During organizational access control process the access control for different roles within the organization is determined. The scope of the contents allowed for different roles is determined and verified. Further, the access control information is embedded accordingly. The access control information added document is then processed (507).

Furthermore, encryption is performed (508) on the transmitted data. Encryption is performed is order to ensure that the information is secured during transmissions of the data/document to remote server at the client location. The encrypted format is then saved (509). The various actions in method 500 may be performed in the order presented, in a different order or simultaneously. Further, in some embodiments, some actions listed in FIG. 5 may be omitted.

Figure 6:
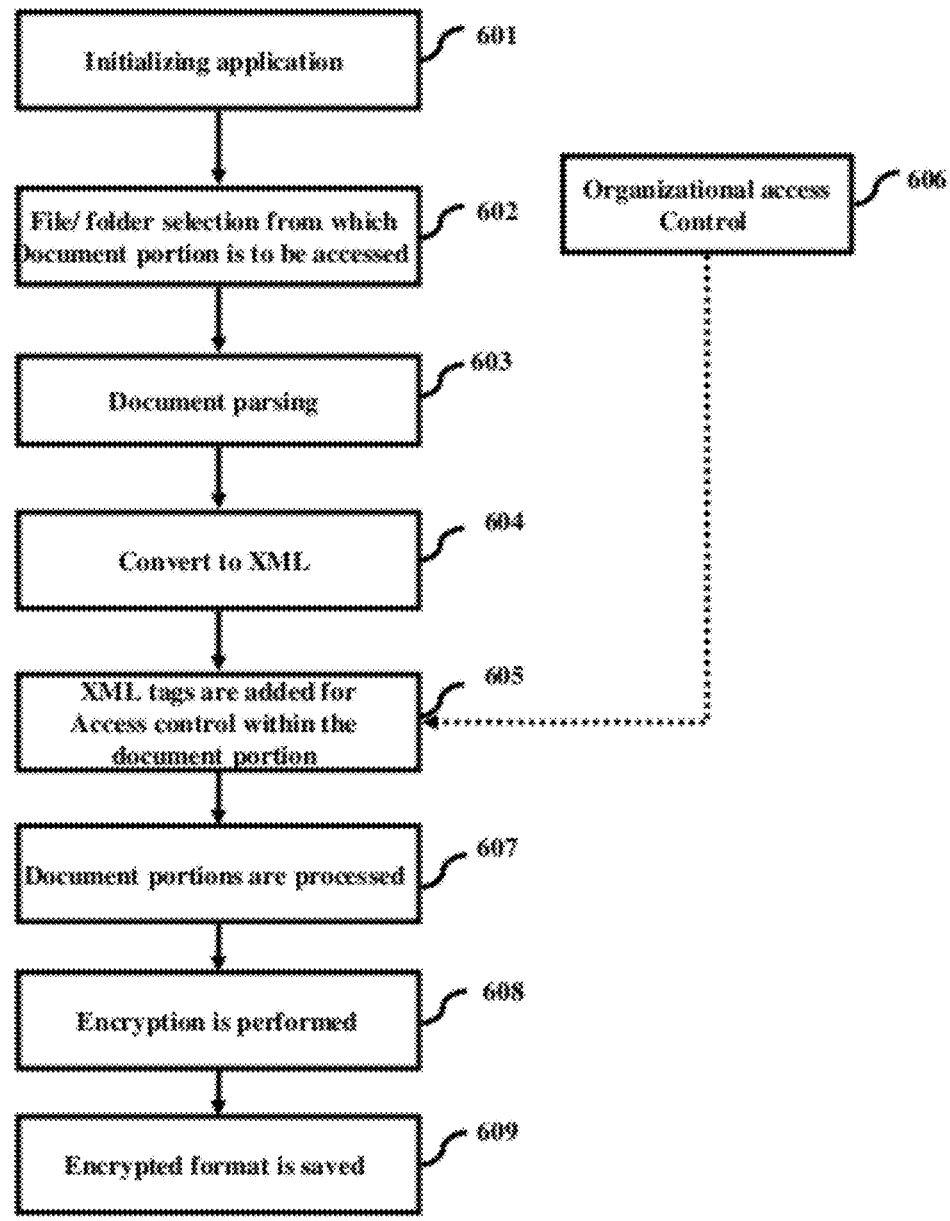
FIG. 6 is a flow diagram depicting the server side document processing for mobile agents, according to an embodiment herein.

FIG. 6 is a flow diagram depicting the server side document processing for mobile users, according to an embodiment herein. The embodiments herein consider that agents are mobile and hence only portions of the document are sent to the agent.

However, the same may be applied to the entire document as well. Further, the document may be structured document or an unstructured document. At the beginning the applications are initialized (601). During initialization, the applications for which the access control is to be provided are identified. On initialization, the file or folder containing the portions of the document for which access control is to be enabled is selected (602). The identified portions of the document are then parsed (603) by the document parser 404. During document parsing, two basic steps are carried out one is the document type identification and page count and content analysis. In case of document type identification process, the type of document is that may be MS word document, MS excel or PDF is identified. During document parsing, start of the document, end of the document, contents or portions within the documents that are to be accessed by different agents and so on are identified. In an embodiment, document parser 404 may also help to identify the sections of the documents for access based on roles, location and time of access. In the second step, page count and content analysis is performed. During this step, the content is analyzed and Meta data information is extracted such as author, count of sections, images and pages. The extracted Meta data information is fed to the next module i.e., the document splitter 405 where the document is further processed. The document splitter implements the business logic behind splitting and performs file selections and XML conversion. During XML conversion the relevant XML representations for the selected portions of the document are created (604). Further, the selected portions of the document are attached (605) appropriate XML tags for access control. During this step, the access control information is accessed from organization access control logic. This converts the logic into XML and embeds all the XML based representations. A single data packet is created for transmission. The XML tag for access control is as depicted below:

```
<AccessControl>
    <user>ramdin</user>
    <section_with_access>1,5-7</section_with_access>
        <overlapping_section>7</overlapping_section>
</AccessControl >
```

In an embodiment, the access control information embedded within the document may be based on several attributes that include the location of the agent, device ID of the agent, time of access and so on. When the agent is mobile the access control information may be tagged within the document and may be tagged based on the location. For example, if a supervisor A is known to be accessing information from his site X and another supervisor is known to access information from his site Y. During embedding access control information, the document portion to be accessed by supervisor A is tagged with location X and the document portion to be accessed by supervisor B are tagged with location Y. When supervisor A reaches his site X he is provided access to only his portion of the document that is tagged for location X. On similar lines, supervisor B is provided access to his portion of the document. Examples of XML tags for location and device ID is depicted below:

```
<AccessControl>
<location_start_co-ordinate>ramdin</location_end_co-ordinate>
    <section_with_access>1,5-7</section_with_access>
        <overlapping_section>7</overlapping_section>
</AccessControl >
<AccessControl>
    <device_ID>ramdin<device_ID>
    <section_with_access>1,5-7</section_with_access>
        <overlapping_section>7</overlapping_section>
</AccessControl >
```

Further, the organizational access control is also performed (606) in order to attach XML tags for access control. During organizational access control process the access control for different roles within the organization is determined. The scope of the contents allowed for different roles is determined and verified. Further, the access control information is embedded accordingly. The access control information added document is then processed (607).

Furthermore, encryption is performed (608) on the transmitted data. Encryption is performed is order to ensure that the information is secured during transmissions of the data/document to remote server at the client location. The encrypted format is then saved (609). The various actions in method 600 may be performed in the order presented, in a different order or simultaneously. Further, in some embodiments, some actions listed in FIG. 6 may be omitted.

In some embodiments, the steps of document parsing and converting the document to XML may happen in parallel, or together as a combined step in an intertwined manner. For example, in some embodiments, document parsing may involve leveraging XML tags to identify structural elements such as sections and paragraphs.

Figure 7:
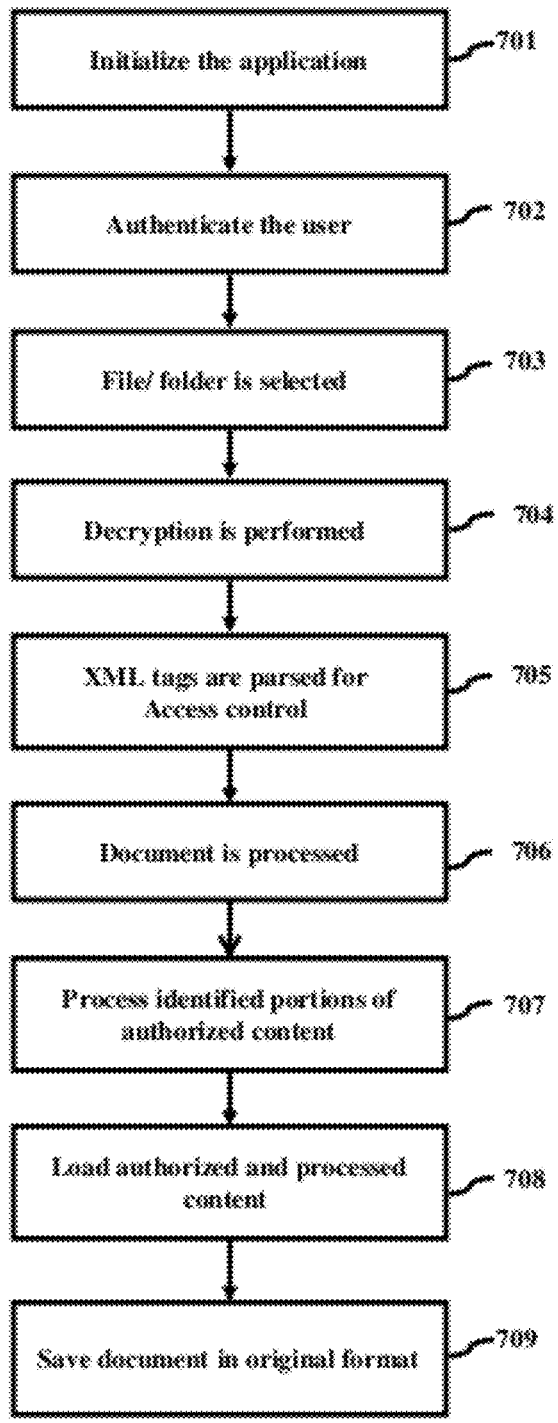
FIG. 7 is a flow diagram depicting the client side document processing, according to an embodiment herein.

FIG. 7 is a flow diagram depicting the client side document processing, according to an embodiment herein. The client side receives the document or the data. On receiving the document/ data the applications are initialized (701). On initialization, the agent is authenticated (702). During authentication, user credentials of the agent are verified by the server in order to provide access to the user content. The file or folder containing the document is then selected (703). On selection, the document is decrypted (704) by the client application in a user transparent manner. Further, the XML tags are parsed (705). The tags are parsed for access control. On parsing the XML tags the content authorized for access by every agent is determined. In an embodiment, the access may be based on role, location, device ID of the agent and so on. The XML representations of the document and associated access control are parsed while validating for completeness and structural accuracy. The document with the access control information is processed (706). Furthermore, the content of the portions identified are processed (707) to be presented in an appropriate manner to the agent. Processing includes performing updates on data entry, translation, proof reading and so on. The processing performed on the content of the identified portions may differ in various embodiments. In case, the information is incomplete an error message is produced requesting for more information. The authorized and processed content is loaded (708) to be presented to the agent. Further, the selected content will be used to generate a valid document for the agent. The agents will either modify this document part for example, tasks like proof reading or create a corresponding new document part example translation, digitization of unstructured document and so on. The document will then be saved (709) with an appropriate name such as <OLD_NAME>_NEW_Part1.doc. Thus the document is saved in the original format. In an example, say if the original document is in word format and during document distribution the document is converted into a format that is suitable form for transmission. Different agents may then access the documents and modify the document. The modified document may be aggregated and then converted into the word format and stored at the central server 101. During aggregation, each new part-of-document is compared against the overlapping portions of the adjacent parts e.g. by calculating MD5 hash value of content. If there is a mismatch in computed hash values, then they are flagged as conflict and sent for manual validation. In some application, automatic validation could also be possible. The various actions in method 700 may be performed in the order presented, in a different order or simultaneously. Further, in some embodiments, some actions listed in FIG. 7 may be omitted.

Figure 8:
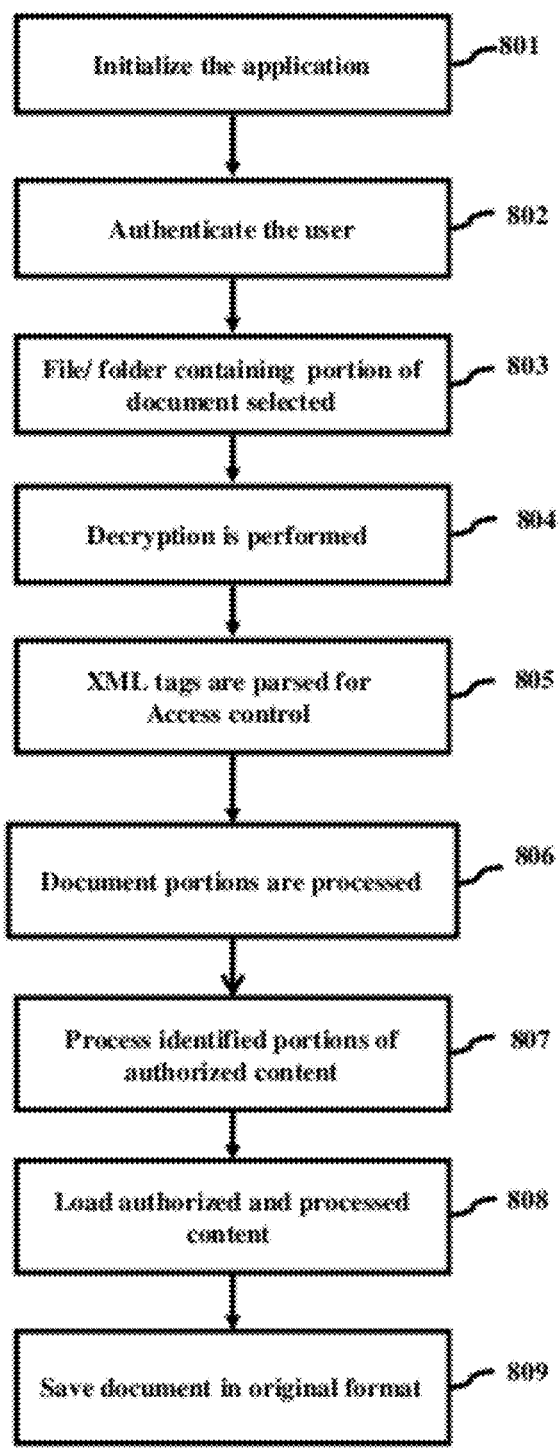
FIG. 8 is a flow diagram depicting the client side document processing for mobile agents, according to an embodiment herein.

FIG. 8 is a flow diagram depicting the client side document processing for mobile users, according to an embodiment herein. The embodiments herein illustrate providing partial document access to the agents. However, the same may be extended to entire document access as well. The client side receives the document or the data. On receiving the document/ data the applications are initialized (801). On initialization, the agent is authenticated (802). During authentication, user credentials of the agent are verified by the server in order to provide access to the user content. The file or folder containing the document is then selected (803). On selection, the document is decrypted (804) by the client application in a user transparent manner. Further, the XML tags are parsed (805). The tags are parsed for access control. On parsing the XML tags the content authorized for access by every agent is determined. In an embodiment, the access may be based on role, location, device ID of the agent and so on. The XML representations of the document and associated access control are parsed while validating for completeness and structural accuracy. The document with the access control information is processed (806). Furthermore, the content of the portions identified are processed (807) to be presented in an appropriate manner to the agent. Processing includes performing updates on data entry, translation, proof reading and so on. The processing performed on the content of the identified portions may differ in various embodiments. In case, the information is incomplete an error message is produced requesting for more information. The authorized and processed content is loaded (808) to be presented to the agent. Further, the selected content will be used to generate a valid document for the agent. The agents will either modify this document part for example, tasks like proof reading or create a corresponding new document part example translation, digitization of unstructured document and so on. The document will then be saved (809) with an appropriate name such as <OLD_NAME>_NEW_Part1.doc. Thus the document is saved in the original format. In an example, say if the original document is in word format and during document distribution the document is converted into a format that is suitable form for transmission. Different agents may then access the documents and modify the document. The modified document may be aggregated and then converted into the word format and stored at the central server 101. The various actions in method 800 may be performed in the order presented, in a different order or simultaneously. Further, in some embodiments, some actions listed in FIG. 8 may be omitted.

Figure 9:
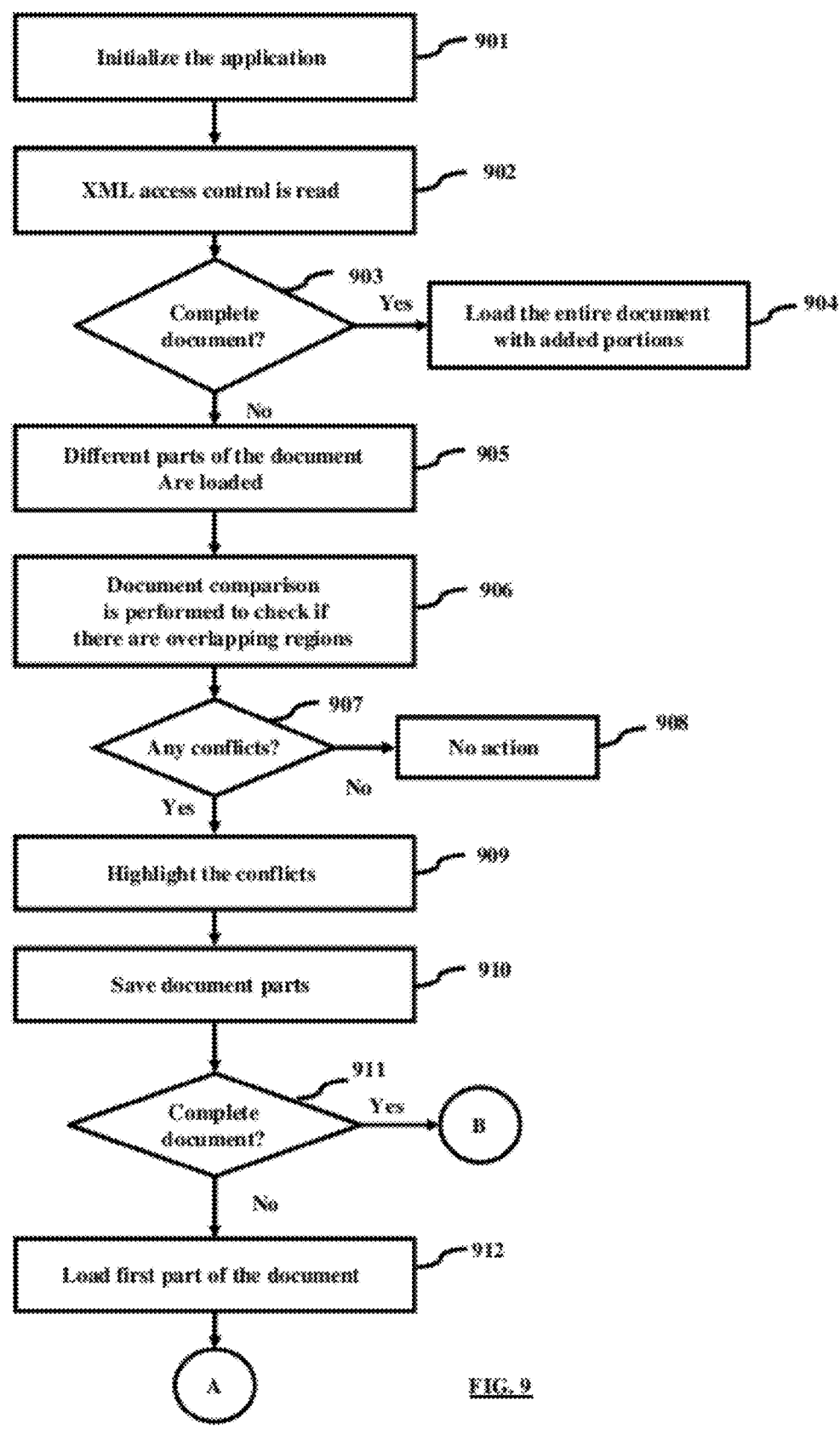
FIG. 9 is a flow diagram depicting the process of performing consistency check and aggregation on the document, according to an embodiment herein.
Figure 9:
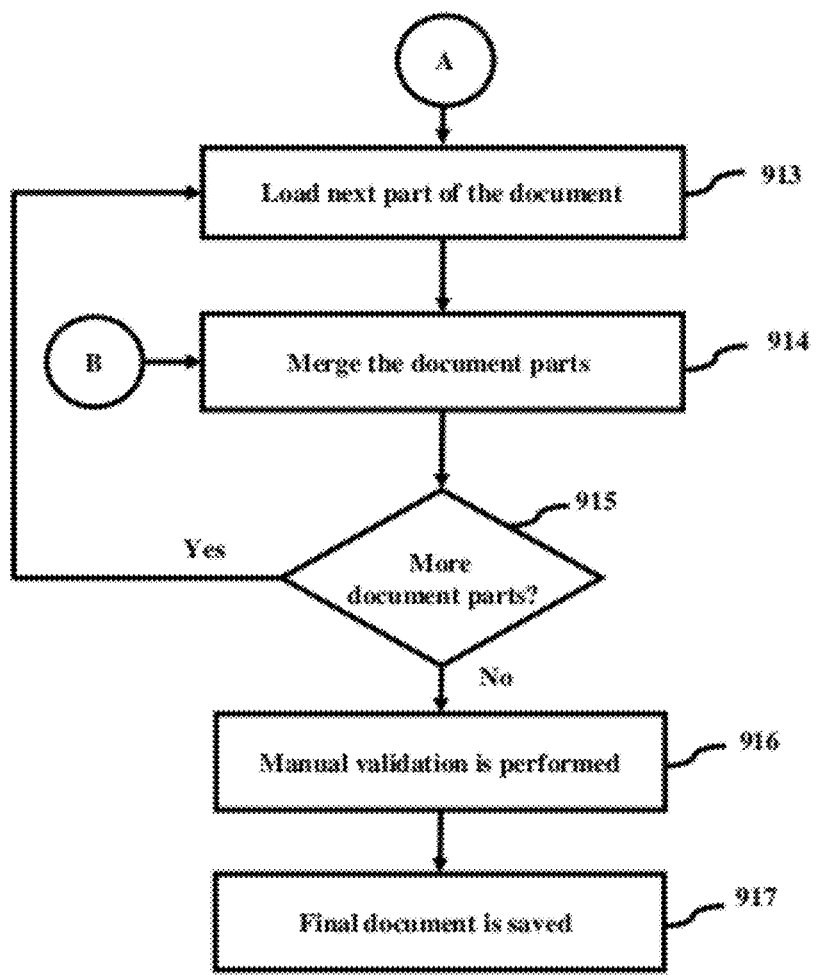

FIG. 9 is a flow diagram depicting the process of performing consistency check and aggregation on the document, according to an embodiment herein. The aggregation module performs two tasks. Firstly, it checks consistency by comparing overlapping splits for detecting conflicts. Secondly, it stitches together different parts of the documents to create a new document. Consistency check is performed first followed by aggregation.

The application is initialized (901). On initialization, the XML data access control is read (902). Further, a check is made (903) in order to determine if the document obtained is a portion of an original document or if it is an entire document. If the document is modified version of an original document, then the entire document is loaded (904). On the other hand, if the document is a portion of the original document then part by part of the portions are loaded (905). During this process the module will load the XML access control information in the memory to identify the overlapping regions of different parts of the documents. The overlapping regions are identified from the XML tags as the XML tags indicated <overlapping_section>. In an embodiment, the modified or newly generated document parts will be accessed one at a time. After the documents are loaded, comparison is performed (906). During comparison, each new part will be compared against the overlapping sections of the adjacent parts. The adjacency information is obtained from the way the new or the modified files are named. The actual level of comparison will depend on the type of the application. For example, for tasks like translation only surface level text comparison is preformed. A check is made (907) if there are any conflicts. In case there are no conflicts during document comparison no action is taken (908). On the other hand, if there are conflicts then the conflicts are highlighted (909). During highlighting, for every comparison if two overlapping portions don't exactly match (content wise) then the same content will be highlighted in a different color and the files are saved. The document parts are saved (910).

Further, the process moves on to aggregation. During aggregation, document concatenation is performed. A check is made to determine (911) if the modified document is a portion of an original document or if it is a whole document whose sections are modified. If the document is a whole document that is modified by the agents then the step moves to 914. In this step, the modified contents of the documents are merged with that of the original document and the changes made only in that the relevant portions are saved. On the other hand, if portions of the documents are obtained from the agents then the portions are loaded one after the other to merge the documents. The first part of the document is loaded (912). Then the next part of the document is loaded (913). The new documents are accessed in order one after the other and concatenated or merged (914) in the same order. The new document formed will correspond to the original document with different conflicting regions highlighted. Further, a check is made (915) if there are more parts to the corresponding document. In case there are more parts, then the process moves to step 913. If there are no more parts, then manual validation of the document is done (916). In an embodiment, the name of the new document formed after concatenation will reflect the correspondence and will be tagged with "conflict" if there are conflicting portions in the document. During validation, a manual supervisor will go over newly created documents which are marked for conflicts and make the document consistent. The final version of the document is saved (917). The various actions in method 900 may be performed in the order presented, in a different order or simultaneously. Further, in some embodiments, some actions listed in FIG. 9 may be omitted.

In an embodiment, the agent may be provided role based access to partial documents on his mobile communication device, desktop, laptop and the like. In case of such an access the agent first makes a request for the document. The request is processed by the central server 101. The central server 101 authenticates the agent based on his credentials. In an example, the identification of the user may be done based on his mobile phone number or a combination of the name of the agent with his mobile phone number, a security code, ID number of the device and so on. The authentication process helps to identify the level of access to the agents, the agent's relevant access list and the document sub-parts relevant to the agent. In an embodiment, as a part of the business logic the document sub-parts of all the agents have to be defined earlier. Further, the requested document is fetched from the central server 101. The central server 101 tags the Meta data information for every document and thus the client side device can easily parse this information and determine the levels of access to different agents.

As application sits on the client's side device i.e., the mobile phone of the agent. The application verifies the agent's details every time the agent logs in with his name. Further, the mobile phone number details would be obtained by the application and matched with the agent. On receiving the document from the central server 101 the application on the mobile phone parses the document. During parsing the application decodes the Meta data information and determines the accessibility defined for the agent. The agent is then provided with the part of the document that is permissible for his view. In addition, the agent may perform edits, updates or deletes on his part of the document on his mobile phone. After the editing is accomplished the original document is programmatically edited, edits are made into the appropriate part of the document and saved back. In order to preserve the sanctity of the document versioning is maintained. In case there are any conflicts they may be resolved automatically and or escalated for manual solutions.

FIG. 10 is a snapshot depicting an example implementation of accessing partial electronic documents, according to an embodiment herein. Depicted is a snapshot for partial document content access on the mobile phone of an agent when requested by an agent. The agent sends his mobile phone number or a combination of the mobile phone number and his name in order to authenticate himself. The details of the agent are authenticated by the central server 101. Later, the agent accesses the content at the site and inputs his user credentials. Based on the credentials input by the agent he is provided access to the permissible part of the document. As depicted is the product report for manufacturing operations provided to the agent's mobile phone. The report indicates details such as location, manager name, manager's number, client, center number, date, items, defects if any, items shipped, estimated date of completion and so on. Further, the agent is provided with options in order to perform edits on the section of the document that is provided to him For example, the agent may edit details such as the date, items shipped, estimated date of completion and the like. The updated information is saved. The document may be provided a new version number and saved.

As depicted in the second snapshot information is retrieved according to the device identifier which in this case is proposed to be the mobile phone number (or mobile phone number+name of agent). In this case, the agent looks at an order which has been uploaded by the supervisor the previous day on his mobile phone. On starting the application, the agent inputs his name (or username) into the application. The agent then receives a data request (or an SMS request) from the particular agent along with his phone number. In a lookup table, the data needs of the agent is looked up and the relevant data is fetched from the larger excel sheet. This is then sent back to the agent through the application (or SMS) and the agent views the order requirements for him for the day. Once the agent completes the day's work, he would like to update the sheet with the new order completion details. He does this by updating the respective cells in the application on the mobile phone. This is sent as a data request again (or SMS) to the server which notes the request from the same phone number+name combination and stores it accordingly in the excel sheet. Permissions can be set by the hierarchy according to requirements, for example, some agents may be trusted to update the order information as they complete it, whereas for other agents the setting may be that they can view but not update the information, with only the supervisor having updating rights. As a result, document updating is permitted for the content provided to the agent and the agent may update the date, order number, shipping details, components and so on.

Figure 11:
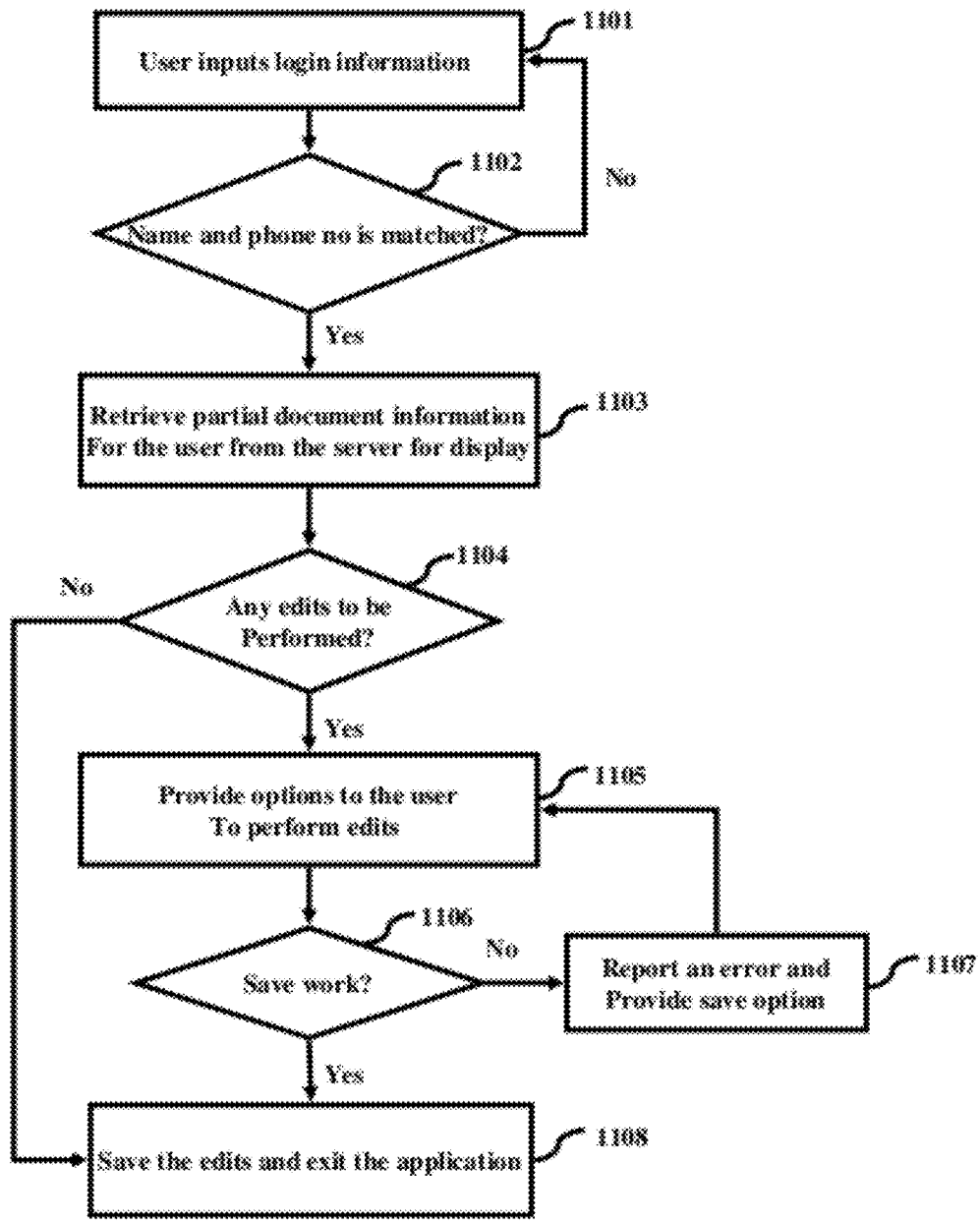
FIG. 11 is a flow diagram depicting a mobile agent retrieving partial electronic document, according to an embodiment herein.

FIG. 11 is a flow diagram depicting a mobile user retrieving partial electronic document, according to an embodiment herein. An agent who is working at the client location may want to access a portion of the document from the location. The agent may employ his mobile phone to access the information as the cellular network connectivity is much better than Internet connectivity even at the remote locations. The agent may input (1101) his login information. The login information may be his name, mobile number or the like depending of the configurations performed at the network. The client side component sends the information to the central server 101 through the Internet 102. The information on the server may be checked (1102) in order to match if the agent's name and mobile number matches with that stored on the server. This is because access to parts of the document is assigned initially and every agent is provided access only after validating his details. If there is a match to the stored information then the partial information or contents of the document that is requested by the agent is retrieved (1103) from the central server 106. The information is then displayed on the mobile phone of the agent. In case there is no match in the information then the process moves to step 1101. Further, a check is made (1104) if the agent wishes to perform any edits on the part of the document. If the agent wants to edit text and update his work on the document, then the document is made editable (1105). The cursor is made movable over editable textboxes. This enables the agent to make modifications in his documents and save it later. In case there are no edits, the process moves to step 1108. Further, a check is made (1106) if the agent wants to save his work. If the agent wishes his work is saved and the application exists (1108). On the other hand, if the agent doesn't save his work an error message is produced (1107) asking him to save his edits in the document. The various actions in method 1100 may be performed in the order presented, in a different order or simultaneously. Further, in some embodiments, some actions listed in FIG. 11 may be omitted.

In an embodiment, the access to partial documents may be provided based on the location of the agent. The Meta data information within the document may be tagged with location tags. This type of an arrangement is suitable in cases where agents have fixed locations of working. In such a case, when the agent visits the location and tries to access the document at the location he is immediately identified based on his location tag and provided the part of the document that is assigned for his credentials. In an embodiment, the location may be tracked by the GPS application, GPRS service and so on. In another embodiment, the agent may employ device such as a mobile phone, laptop and the like in order to access partial documents. In another embodiment, the access to documents may be provided based on the ID of the agent's device and the like.

In an embodiment, by providing role based access to the documents the security of the documents is increased. This is because different parts of the document will be visible to different agents depending on their user credentials and responsibilities. Further, even if the document inadvertently reaches unauthorized persons during distribution the security of the document will be maintained as the access to sections of the document is provided only on verification of the agent's credentials. In addition, embedding access control information in the document would make the accessibility of the document to agents independent of network connectivity.

In an embodiment, partial document access is possible for different document formats including Microsoft word, XML format or any other format that can be converted to the XML format.

In an embodiment, partial access to the documents may be provided on a mobile phone or a personal computer. In case of mobile phone access to the document the access control information is embedded within the original document. The access control is stored on the server in a database and then embedded in the document. Depending upon the role of the person requesting access, appropriate information is sent back to the mobile phone. The logic of what information to display is decided on the server.

On the other hand, in case of personal computer access to the document the access control information may be specified in a package. The information is embedded as a separate super document format. Further, in case of mobile phone access document fragments may be transmitted. In case of personal computer access super documents and fragments of the documents may be transmitted. When the application opens the package, the access controls determine what part of the document should be visible to the user using the application. In another embodiment, it is also possible for an agent to request access remotely and then just retrieve their portion of the document over the network. Also, if the agent is not constrained by the use of low end phones the entire document may be sent to the agent who can then see only what he/she is permitted.

The embodiments disclosed herein can be implemented through at least one software program running on at least one hardware device and performing network management functions to control the network elements. The network elements shown in FIGS. 1, 2 and 3 include blocks which can be at least one of a hardware device, or a combination of hardware device and software module.

The embodiment disclosed herein specifies a system for providing role based partial access to electronic documents. The mechanism allows an agent in order to have access to partial contents of an electronic document by providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written a programming language, or implemented by one or more software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method of providing access to portion of a document in a distributed environment, said method comprising:
   identifying structural components in said document for criteria based access by a document parser;
   embedding, using a processor, said criteria based access information in said document by a document splitter;
   providing access to identified structural components of said document to identified agents based on said criteria;
   processing one or more structural components of said document by authenticated agents satisfying said criteria to produce one or more updated structural components of said document; and
   aggregating said one or more updated structural components of said document to produce a new document, wherein said aggregating comprises:
      performing consistency check for said document by determining overlapping regions of said document by an aggregation module;
      comparing overlapping regions of said document by said aggregation module; and
      concatenating new parts of said document by said aggregation module.

2. The method as in claim 1, wherein said method further comprising:
   encrypting said document by said document parser after embedding role based access information; and
   decrypting said unstructured document by a client terminal before allowing an agent to process one or more structural components of said document.

3. The method as in claim 1, wherein providing access to identified structural components of said document further comprises:
   sending said document to one or more client terminals; and
   said one or more client terminals receiving said document for further processing.

4. The method as in claim 1, wherein providing access to identified structural components of said document further comprises:
   sending identified structural components of said document to one or more client terminals; and
   said one or more client terminals receiving structural components authorized for further processing.

5. The method as in claim 1, wherein said method embeds said access control information in at least one of:
   a document fragment;
   a document; and
   a super document.

6. The method as in claim 1, wherein said criteria is at least one among:
   an agent role;
   an agent identifier;
   a location; and
   a terminal identifier.

7. The method as in claim 1, wherein said structural components comprise of:
   paragraphs;
   pages;
   sections;
   chapters;
   cells;
   rows;
   columns; and
   worksheets.

* * * * *